United States Patent
Stachnik et al.

(10) Patent No.: US 11,448,746 B2
(45) Date of Patent: Sep. 20, 2022

(54) METHOD OF ESTIMATING A VELOCITY MAGNITUDE OF A MOVING TARGET IN A HORIZONTAL PLANE AND RADAR DETECTION SYSTEM

(71) Applicant: Aptiv Technologies Limited, St. Michael (BB)

(72) Inventors: Mateusz Stachnik, Gdow (PL); Dariusz Cieslar, Cracow (PL)

(73) Assignee: Aptiv Technologies Limited, St. Michael (BB)

( * ) Notice: Subject to any disclaimer, the term of this patent is extended or adjusted under 35 U.S.C. 154(b) by 203 days.

(21) Appl. No.: 16/386,691

(22) Filed: Apr. 17, 2019

(65) Prior Publication Data

US 2019/0361106 A1  Nov. 28, 2019

(30) Foreign Application Priority Data

May 23, 2018 (EP) .................................... 18173846

(51) Int. Cl.
*G01S 13/58* (2006.01)
(52) U.S. Cl.
CPC ................... *G01S 13/588* (2013.01)
(58) Field of Classification Search
CPC .... G01S 13/588; G01S 13/931; G01S 13/589; G01S 13/874; G01S 2013/93274; G01S 2013/932; G01S 13/42; G01S 13/584; G01S 13/343; G01S 2013/93271; G01S 7/2921; G01S 13/92; G01S 7/02
USPC ........................................................ 342/105
See application file for complete search history.

(56) References Cited

U.S. PATENT DOCUMENTS

| | | | |
|---|---|---|---|
| 6,202,027 B1 | 3/2001 | Alland et al. | |
| 9,043,132 B2 | 5/2015 | Obi | |
| 9,187,091 B2 | 11/2015 | Mills | |
| 9,390,624 B2 * | 7/2016 | Minemura | G01S 13/867 |
| 9,983,301 B2 | 5/2018 | Liu et al. | |
| 10,114,106 B2 | 10/2018 | Schiffmann et al. | |

(Continued)

FOREIGN PATENT DOCUMENTS

| | | |
|---|---|---|
| CN | 103183028 | 7/2013 |
| CN | 104290752 | 1/2015 |

(Continued)

OTHER PUBLICATIONS

Machine translation of specification of DE102013011239, Jan. 8, 2015 (Year: 2015).*

(Continued)

*Primary Examiner* — Timothy X Pham
(74) *Attorney, Agent, or Firm* — Sawtooth Patent Group PLLC

(57) ABSTRACT

The present invention relates to a method of estimating a velocity magnitude of a moving target in a horizontal plane using radar signals received by a radar detection system, the radar detection system being configured to resolve multiple dominant points of reflection, i.e. to receive a plurality of radar signals from the moving target in a single measurement instance of a single, wherein each of the resolved points of reflection is described by data relating to a range, an azimuth angle and a raw range rate of the points of reflection in said single radar measurement instance. The invention further relates to a radar detection system.

21 Claims, 6 Drawing Sheets

(56) References Cited

U.S. PATENT DOCUMENTS

| | | | |
|---|---|---|---|
| 10,634,766 | B2 | 4/2020 | Stachnik et al. |
| 2005/0075788 | A1 | 4/2005 | Smith et al. |
| 2005/0216146 | A1 | 9/2005 | Bauer et al. |
| 2011/0068970 | A1 | 3/2011 | Mitsumoto |
| 2011/0122014 | A1* | 5/2011 | Szajnowski ............. G01S 13/26 342/109 |
| 2012/0242530 | A1* | 9/2012 | Luebbert ............... G01S 13/343 342/70 |
| 2013/0030686 | A1* | 1/2013 | Morotomi ......... B60W 30/0953 701/301 |
| 2015/0054676 | A1 | 2/2015 | Vinski et al. |
| 2016/0202346 | A1 | 7/2016 | Anderson et al. |
| 2017/0206436 | A1 | 7/2017 | Schiffmann |
| 2017/0363727 | A1 | 12/2017 | Prasad et al. |
| 2017/0363728 | A1 | 12/2017 | Prasad et al. |
| 2018/0024228 | A1 | 1/2018 | Schiffmann et al. |
| 2018/0356498 | A1 | 12/2018 | Stachnik et al. |
| 2018/0356517 | A1 | 12/2018 | Cieslar et al. |
| 2019/0004166 | A1 | 1/2019 | Orlowski et al. |
| 2019/0361113 | A1 | 11/2019 | Ray |
| 2019/0369228 | A1 | 12/2019 | Stachnik et al. |
| 2020/0057090 | A1 | 2/2020 | Stachnik et al. |
| 2020/0182992 | A1 | 6/2020 | Kellner et al. |

FOREIGN PATENT DOCUMENTS

| | | | |
|---|---|---|---|
| CN | 105842684 | | 8/2016 |
| CN | 106372278 | | 2/2017 |
| CN | 107209264 | | 9/2017 |
| DE | 10 2013 011239 | A1 | 1/2015 |
| DE | 10 2013 018310 | A1 | 4/2015 |
| DE | 102013019804 | | 5/2015 |
| EP | 2307908 | B1 * | 1/2012 ........... G01S 13/931 |
| EP | 3285230 | | 2/2018 |
| GB | 2504376 | | 1/2014 |
| JP | 2015111332 | | 6/2015 |
| KR | 20080007780 | | 1/2008 |

OTHER PUBLICATIONS

Machine translation of specification of DE 102013018310, Apr. 30, 2015 (Year: 2015).*

"Extended European Search Report", EP Application No. 18175505.9, dated Nov. 27, 2018, 8 pages.

"Extended European Search Report", EP Application No. 17175548.1, dated Dec. 15, 2017, 9 pages.

"Final Office Action", U.S. Appl. No. 16/004,487, filed Oct. 21, 2020, 7 pages.

"Foreign Office Action", CN Application No. 201810586972.1, dated Nov. 4, 2020, 14 pages.

"Non-Final Office Action", U.S. Appl. No. 16/409,019, filed Feb. 16, 2021, 20 pages.

"Non-Final Office Action", U.S. Appl. No. 16/004,487, filed Mar. 17, 2020, 8 pages.

"Non-Final Office Action", U.S. Appl. No. 16/004,487, filed Feb. 3, 2021, 8 pages.

Brobeit, et al., "Fusion of Doppler Radar and Geometric Attributes for Motion Estimation of Extended Objects", Oct. 2015, 5 pages.

Fischler, et al., "Random Sample Consensus: A Paradigm for Model Fitting with Applications to Image Analysis and Automated Cartography", Jun. 1981, pp. 381-395.

Kellner, "Instantaneous Full-Motion Estimation of Arbitrary Objects using Dual Doppler Radar", Jun. 2014, 6 pages.

Kellner, et al., "Tracking of Extended Objects with High Resolution Doppler Radar", Dec. 2015, 13 pages.

Kmiotek, et al., "Representing and Tracking of Dynamics Objects Using Oriented Bounding Box and Extended Kalman Filter", Oct. 2008, pp. 322-328.

Roos, et al., "Estimation of the Orientation of Vehicles in High-Resolution Radar Images", Apr. 2015, 5 pages.

Roos, et al., "Reliable Orientation Estimation of Vehicles in High-Resolution Radar Images", Jul. 2016, 9 pages.

Jung, et al., "Rectangle Detection Based on a Windowed Hough Transform", Jan. 2004, 8 pages.

Jung, et al., "Scanning Laser Radar-Based Target Position Designation for Parking Aid System", Sep. 2008, pp. 406-424.

Kellner, et al., "Instantaneous Lateral Velocity Estimation of a Vehicle using Doppler Radar", Jul. 2013, 9 pages.

Roos, et al., "Estimation of the Orientation of Vehicles in High-Resolution Radar Images", Apr. 2015, 4 pages.

Toussaint, "Solving Geometric Problems with the Rotating Calipers", May 1983, 8 pages.

"Foreign Office Action", EP Application No. 17175548.1, dated Jun. 7, 2021, 6 pages.

"Foreign Office Action", CN Application No. 201910747166.2, dated Jun. 9, 2021, 13 pages.

"Notice of Allowance", U.S. Appl. No. 16/409,019, filed Jun. 7, 2021, 10 pages.

"Foreign Office Action", CN Application No. 201810586972.0, dated Jun. 11, 2021, 8 pages.

* cited by examiner

METHOD OF ESTIMATING A VELOCITY MAGNITUDE OF A MOVING TARGET IN A HORIZONTAL PLANE AND RADAR DETECTION SYSTEM

TECHNICAL FIELD OF INVENTION

This disclosure generally relates to radar detection.

BACKGROUND OF INVENTION

Vehicles can be equipped with radars systems used to classify the environment in the vicinity of the vehicle such as to, e.g., detect moving or static objects around the vehicle. Such systems are, for example, used to estimate the motion state of other vehicles for automotive perception systems and can be used in active safety, driver assistance and autonomous driving applications. Due to the perceptive capabilities of the system, in particular to sense other vehicle, vehicles which are equipped with the system are usually denoted as host vehicles.

Typically, a radar system includes Doppler radar technology implemented in a radar sensor unit adapted to receive signals emitted from a host vehicle and reflected by a target. Generally, the captured data comprises radar detection measurements on which basis points of reflection (or point detections) are determined which represent locations in space. These points of reflection are assumed to be located on the surface of the target and can be regarded as having x and y coordinates in the horizontal plane (i.e. on a 2-dimensional plan view/map). Alternatively, the location of a point of reflection may be considered in polar coordinates of (radial) range and azimuth angle.

For many applications in the field of autonomous driving it is desirable to provide an accurate estimation of the velocity of one or more targets in the vicinity of the host vehicle. The velocity of a given target can be derived from a plurality of points of reflection (detections points) which are assumed to be located on the target. This is to say that there are several point detections captured by the Doppler radar from a single target (such target is usually referred to as a distributed/rigid target).

Due to the use of radar, a range rate can readily be determined for each point of reflection, i.e., the rate of change of the (radial) distance between the sensor unit of the host vehicle and the target at the measurement instance. This range rate can be compensated for the velocity of the vehicle in order to get an indication of the "velocity of the point of reflection" which is assumed to be located on the target. However, this indication, which may be denoted as compensated range rate, is usually not an accurate estimate of the velocity of the target due to degrading influence factors such as noise.

Furthermore, the range rates of neighbouring points of reflection of a given cluster can vary, thus leading to uncertainty of estimating the velocity from the points of reflection. In particular, so called wheel-spin detections (i.e., the velocity measured from the wheel speed of the host vehicle does not match with the true speed of the vehicle due to wheel slipping) and clutter (i.e., points of reflection which are not located on the target) can degrade the accuracy of the estimation. Indeed, even when the so-called velocity profile equation is derived from a large number of points of reflection, the estimation can be heavily degraded due to a small number of noisy points of reflection (i.e., outliers).

Therefore, robust estimation algorithms are used in order to reduce the effect of noisy points of reflection. One problem associated with robust estimation algorithms known from the art and which can be employed for estimating the velocity of a target in the scenario described above is that the quality of the estimation cannot be easily controlled. Furthermore, the estimation is demanding in effort and cost with regard to the usage of computational resources due to the number of required iterations, e.g., of the iteratively reweighted least squares algorithm.

A large number of iterations is undesired when the estimation of the velocity needs to be available as fast as possible, i.e., in real-time, which is critical in active safety, driver assistance and autonomous driving applications. On the other side, simply reducing the number of iterations can lead to estimations which are not valid, i.e., the estimations have a large error with respect to ground truth.

In this connection it should be noted that when using the cloud algorithm, a certain "cloud ambiguity" exists. This means that the cloud algorithm is not capable of matching the velocity when the target is yawing and hence a different method of determining the velocity or velocity magnitude is desired in order to effectively determine the velocity of a target when this is yawing. This is because the target velocity is typically determined using a cloud algorithm with two radars that are synchronized, however, the use of two radars is not always possible.

SUMMARY OF THE INVENTION

Thus there is a need to provide a method of determining the velocity of velocity magnitude of a yawing target when the target is visible in only one field of view of a radar detection system. The present invention relates to a method of estimating a velocity magnitude of a moving target in a horizontal plane using radar signals received by a radar detection system, the radar detection system being configured to resolve multiple dominant points of reflection, i.e. to receive a plurality of radar signals from the moving target in a single measurement instance of a single, wherein each of the resolved points of reflection is described by data relating to a range, an azimuth angle and a raw range rate of the points of reflection in said single radar measurement instance. The invention further relates to a radar detection system.

For this reason, an improved method of estimating a velocity magnitude of a moving target using radar is provided. In one aspect, the method minimizes the computational complexity of the radar detection system in order to reduce the demand in effort and cost of the computer system used for the evaluation of the estimate of the velocity magnitude.

In such a system the radar detection system is configured to resolve multiple points of reflection from the moving target in a single measurement instance, wherein each of the resolved points of reflection is described by data relating to a range, an azimuth angle and a raw range rate of the points of reflection in said single radar measurement instance. The method comprises the steps of: assuming that a heading angle calculated for each of the plurality of received points of reflection is equal to an orientation angle of said moving target; and calculating the velocity magnitude of said moving target as a weighted mean of multiple estimates that are estimated from each range rate and azimuth from the points of reflection and heading angle, with the heading angle being an assumed value, in the single radar measurement instance.

Forming the radar detection system such that it is configured to resolve multiple dominant points of reflection, it is configured to receive a plurality of radar signals that are also called scatters or simply detections.

It should be noted that a heading angle calculated for each of the plurality of received radar signals, i.e. the points of reflection, is assumed to be equal to an orientation angle: this means that $h_t = \gamma_t$ of said moving target, i.e. the respective heading angle is correlated to the direction of the longitudinal axis of the moving target. The heading variance is higher than the estimated orientation variance and preferably satisfies the condition:

$$\hat{\sigma}_{h_t}^2 \propto \sigma_{\gamma_t}^2 + k_{heading\_var\_exceed},$$

in particular $\hat{\sigma}_{h_t}^2 = \sigma_{\gamma_t}^2 + k_{heading\_var\_exceed}$. Thereby the availability of the velocity estimation can be further improved.

By employing the weighted means of estimates the velocity magnitude of a moving target can be estimated even when the velocity estimated by other algorithms is unreliable. In order to facilitate this measurement the known measurement accuracy is incorporated to improve the velocity estimation.

Preferably, the resolved points of reflection of said range rate are verified prior to the step of calculating the velocity magnitude as a weighted mean of estimates, with only those points of reflection being used for the step of calculating that satisfy a predetermined condition. In this way, the availability of the estimation of the velocity magnitude is improved and the calculation is only carried out using verified points of reflection leading to a reduction in the computational time required to output the estimate of the velocity magnitude It is preferable if the estimate of the target velocity magnitude as a weighted mean of estimates $V_{t,i}$ is estimated from points of reflection with a range rate satisfying the below equation:

$$\hat{V}_t \propto \frac{\sum_i^n V_{t,i} w_{V,i}}{\sum_i^n w_{V,i}},$$

in particular wherein $$\hat{V}_t = \frac{\sum_i^n V_{t,i} w_{V,i}}{\sum_i^n w_{V,i}},$$

and $w_{V,i}$ ist he weight associated with the i-th estimate. Using the weighted mean of estimates one can avoid the use filtering and/or tracking which is particularly beneficial in view of the reduction in demand in effort and cost of computational power. Thereby making the algorithm suitable for application in production embedded systems because of its low computational complexity.

Advantageously each point of reflection is validated in order to check whether the velocity magnitude can be plausibly estimated. In this way the number of faulty calculations can be reduced further improving the reliability of the estimation of the velocity magnitude.

Preferably each point of reflection is found to be valid if the following condition is satisfied:

$$|\cos \alpha_{a,i}| > k_{min\_cos\_aspect\_angle},$$

where $\alpha_{a,i}$ is the aspect angle and is defined as a difference between orientation angle and azimuth angle of the detection. In this way an estimation of the yaw rate is not required leading to a further reduction in the computational complexity of the method described herein.

It is preferred if a single estimate of the velocity magnitude of the target is calculated as:

$$V_{t,i} \propto \frac{\dot{r}_{i,cmp}}{\cos\alpha_{a,i}},$$

in particular with $$V_{t,i} = \frac{\dot{r}_{i,cmp}}{\cos\alpha_{a,i}},$$

where $\dot{r}_{i,cmp}$ is the range rate compensated for the i-th raw detection. This is a fast and reliable way of estimating the velocity magnitude of the target.

Preferably the weights are selected as an inverse of an estimated variance for a corresponding estimate during the step of estimating the weighted mean of estimates. This further reduces the error in the calculation making the method more reliable.

It is preferred if the weight associated with an estimate satisfies the following equation:

$$w_{V,i} \propto \frac{1}{\sigma_{V_{t,i}}^2},$$

in particular as $$w_{V,i} = \frac{1}{\sigma_{V_{t,i}}^2},$$

where $\sigma_{V_{t,i}}^2$ is a variance of the considered velocity magnitude estimate. In this way the error in the calculation can be even further reduced.

It is particularly preferable if a variance of the single velocity magnitude estimate can be calculated using an uncertainty propagation. In this way an estimated orientation uncertainty is incorporated to improve the estimation of the velocity magnitude.

Advantageously the uncertainty propagation satisfies the following condition:

$$\sigma_{V_{t,i}}^2 \propto V_{t,i}^2 \left( \frac{\sigma_{\dot{r}_{i,cmp}}^2}{\dot{r}_{i,cmp}^2} + \frac{\sigma_{\cos\alpha_{a,i}}^2}{\cos^2\alpha_{a,i}} \right),$$

in particular $$\sigma_{V_{t,i}}^2 = V_{t,i}^2 \left( \frac{\sigma_{\dot{r}_{i,cmp}}^2}{\dot{r}_{i,cmp}^2} + \frac{\sigma_{\cos\alpha_{a,i}}^2}{\cos^2\alpha_{a,i}} \right),$$

with:

$$\sigma_{\dot{r}_{i,cmp}} = \sigma_{\dot{r}}, \sigma_{\cos\alpha_{a,i}}^2 = \sin^2(\alpha_{a,i})\sigma_{\alpha_{a,i}}^2, \text{ and } \sigma_{\alpha_{a,i}}^2 = \hat{\sigma}_{h_t}^2 + \sigma_{\theta}^2.$$

This is a particularly advantageous way of incorporating the estimated orientation uncertainty.

Preferably the uncertainty propagation satisfies the following condition:

$$w_{V,i} \propto \frac{\cos^4 \alpha_{a,i}}{\cos^2 \alpha_{a,i} \sigma^2_{\dot{r}_{i,cmp}} + \dot{r}^2_{t,i}\sigma^2_{\cos\alpha_{a,i}}},$$

in particular $$w_{V,i} = \frac{\cos^4 \alpha_{a,i}}{\cos^2 \alpha_{a,i} \sigma^2_{\dot{r}_{i,cmp}} + \dot{r}^2_{t,i}\sigma^2_{\cos\alpha_{a,i}}}.$$

This is a particularly advantageous way of incorporating the estimated orientation uncertainty into the method of estimating the velocity magnitude and thereby using even less computational complexity.

It is preferred if a variance estimation of the estimated velocity magnitude is carried out, preferably wherein the variance of the estimated velocity magnitude is estimated using weights. This results in improved calculation results that further improve the accuracy of the method.

Preferably the weights satisfy the following condition:

$$\hat{\sigma}^2_{\hat{V}_t} \propto \frac{n}{\sum_i^n w_{V,i}},$$

in particular $$\hat{\sigma}^2_{\hat{V}_t} = \frac{n}{\sum_i^n w_{V,i}}.$$

In this way a particulaly cost saving calculation can be implemented.

It is preferred if a plausibility check for the estimated velocity magnitude is carried out, preferably wherein the plausibility check is based on an estimated variance of the velocity magnitude, wherein the estimated variance satisfies the following condition:

$$\hat{\sigma}_{\hat{V}_t}^2 < k_{max\_magnitude\_var}.$$

Such a plausibility check further improves the reliability of the proposed method and makes this suitable for an algorithm that is intended for application in production embedded systems because of its low computational complexity.

According to a further aspect the present invention further relates to a radar detection system comprising an emitter that is configured to send out a radar signal, a plurality of detection channels that are respectively configured to detect radar signals reflected in the field of view of the radar detection system in a single measurement instance and an evaluation unit, the evaluation unit of the radar detection system being configured to resolve multiple points of reflection from a moving target in a single measurement instance, wherein each of the resolved points of reflection is described by data relating to a range, an azimuth angle and a raw range rate of the points of reflection in said single radar measurement instance, the evaluation further being configured to carry out a method in accordance with the teaching present herein or an object hypothesis algorithm that is compiled to carry out a method in accordance with the teaching presented herein. The advantages achieved by the method discussed in the foregoing can thereby beneficially be incorporated into such a radar detection system.

Further features and advantages will appear more clearly on a reading of the following detailed description of the preferred embodiment, which is given by way of non-limiting example only and with reference to the accompanying drawings.

BRIEF DESCRIPTION OF DRAWINGS

Further details will now be described, by way of example with reference to the accompanying drawings, in which.

DETAILED DESCRIPTION

Figure 1:
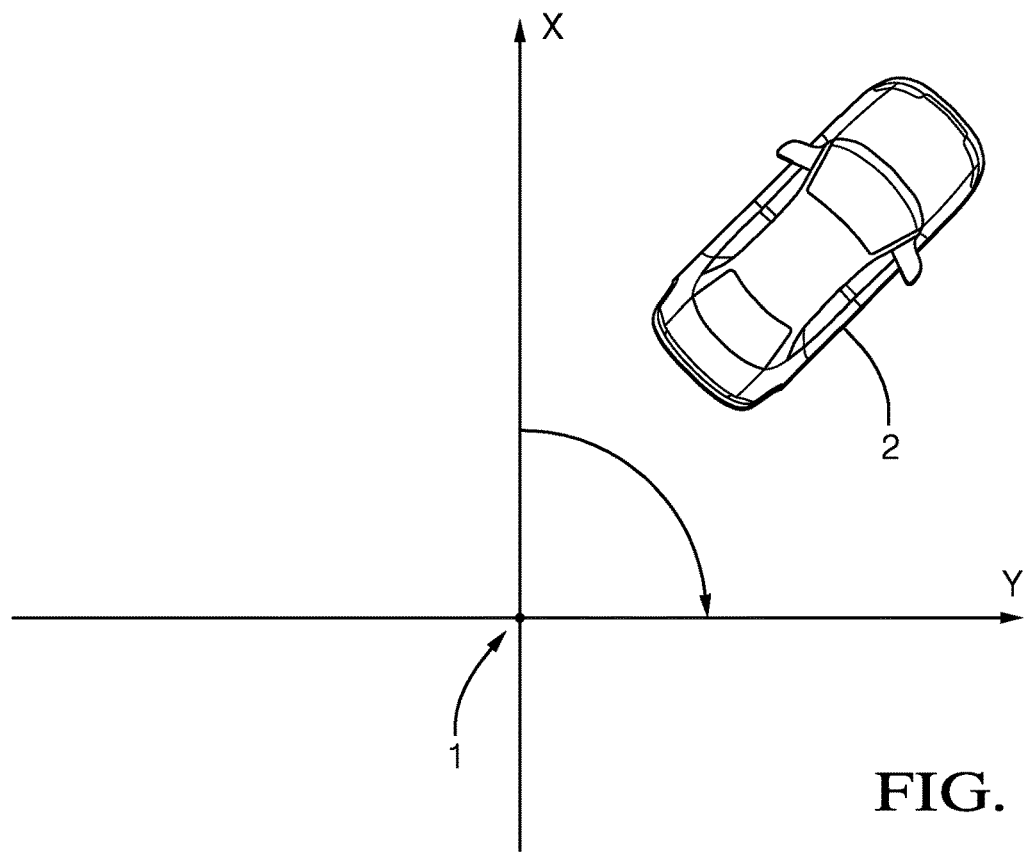
FIG. 1 shows a target coordinate system.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Generally, a host vehicle 4 (see FIG. 2) is equipped with a radar system 5' (see FIG. 2) where reflected radar signals from a target 2 (FIG. 1) in the field of view of the radar system 5' are processed to provide data in order to ascertain the parameters used in the methodology.

Figure 4:
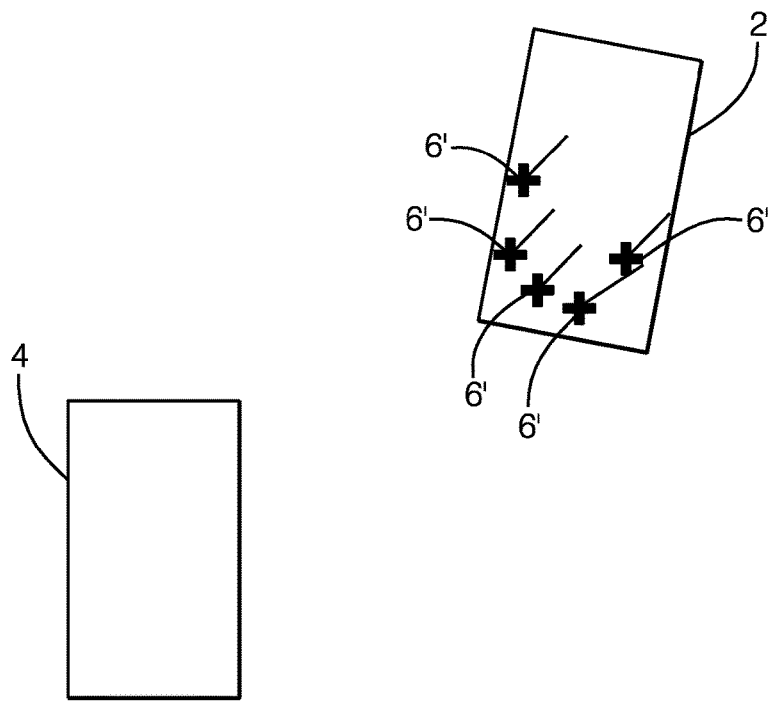
FIG. 4 shows a target vehicle with respect to a host vehicle with points of reflection located on the target vehicle.

In order to do this various conditions and requirements are required. The target 2 (rigid body, e.g. vehicle) needs to be an extended target, i.e., the target allows the determination of a plurality of points of reflection 6' (see FIG. 4) that are reflected from the target 2 in real-time and that are based on raw radar detection measurements.

So, as used herein, the term "extended target" is used to refer to targets 2 that are capable of providing multiple, i.e. two, three or more spaced-apart scattering-points 6' also known as points of reflection 6'. The term "extended target" is thus understood as a target 2 that has some physical size. In this instance it should be noted that the physical size can be selected e.g. in the range of 0.3 m to 20 m in order to be able to detect points of reflection 6' stemming from e.g. a moving person to a moving heavy goods vehicle or the like.

The various scattering points 6' are not necessarily individually tracked from one radar scan to the next and the number of scattering points 6' can be a different between scans. Furthermore, the locations of the scattering points 6' can be different on the extended target 2 in successive radar scans.

Radar points of reflection 6' can be determined by the host vehicle 4 from radar signals reflected from the target 2, wherein a comparison of a given reflected signal with an associated emitted radar signal can be carried out to determine the position of the radar point of reflection 6', e.g., in Cartesian or Polar coordinates (azimuth angle, radial range) with respect to the position of a radar-emitting and/or radar-receiving element/unit on the host vehicle, which can be the position of the radar sensor unit.

By using, e.g., Doppler radar techniques, the range rate is also determined as known in the art. It is to be noted that the "raw data" from a single radar scan can provide the parameters $\theta_i$ (azimuth angle) and $\dot{r}_i$ (raw range rate, i.e., radial velocity) for the i-th point of reflection of n points of reflection. These are the parameters which are used to estimate the velocity of a (moving) target, wherein i=1, ... , n.

It is also to be noted that the term instantaneous radar scan, single radar scan or single measurement instance can include reflection data from a "chirp" in Doppler techniques, which may scan over, e.g., up to 2 ms. This is well known in the art. In the subsequent description, the following conventions and definitions are used:

World Coordinate System

FIG. 1 shows an illustration of a world coordinate system with the origin 1 fixed to a point in space—it is assumed that this world coordinate system does not move and does not rotate in the following mathematical description. Conventionally, the coordinate system is right-handed; the Y-axis, orthogonal to the X-axis, pointing to the right; the Z-axis pointing into the page and an azimuth angle is defined in positive direction (clock-wise) with respect to the X-axis. FIG. 1 further shows the extended target 2 in the form of a vehicle, e.g. an object having a length of approximately 4.5 m.

Vehicle Coordinate System

Figure 2:
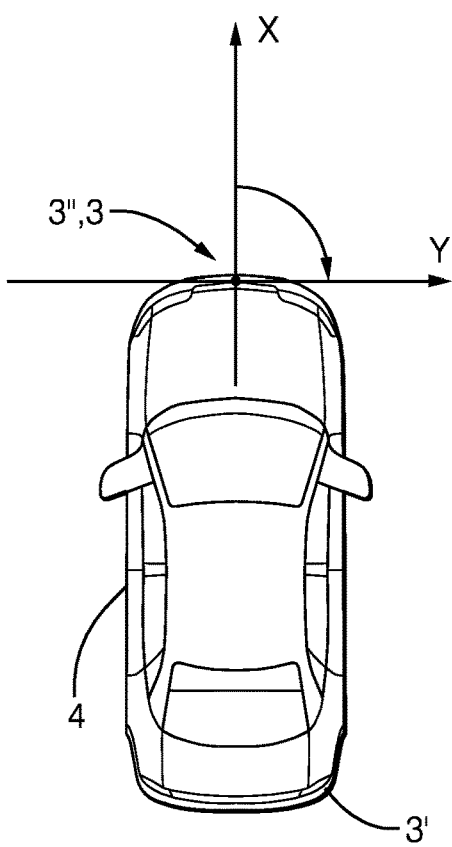
FIG. 2 shows a vehicle coordinate system.

FIG. 2 shows a vehicle coordinate system that in the present instance has its origin 3" located at the center of the front bumper 3 of a host vehicle 4. It should be noted in this connection that the origin 3" of the vehicle coordinate system can be arranged at different positions at the host vehicle 4.

In the present instance the X-axis is parallel to the longitudinal axis of the hostvehicle 4, i.e. it extends between the front bumper 3 and a rear bumper 3' and intersects with the center of the front bumper 3 if the origin 3" is located there. The vehicle coordinate system is right-handed with the Y-axis orthogonal to the X-axis and pointing to the right, the Z-axis pointing into the page. An (azimuth) angle is defined as in the world coordinate system.

Sensor Coordinate System

Figure 3:
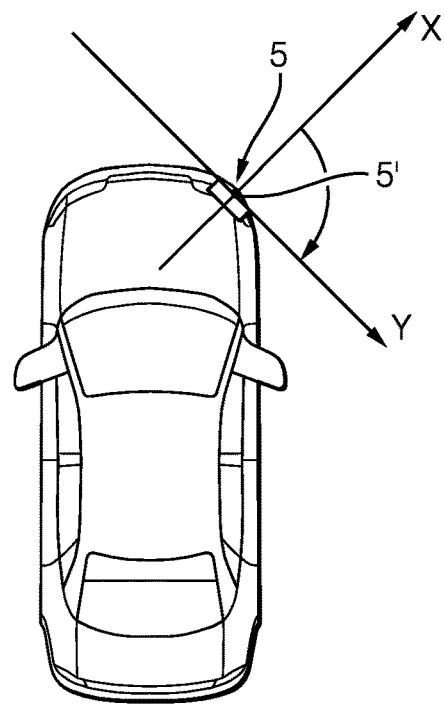
FIG. 3 shows a sensor coordinate system.

FIG. 3 shows a sensor coordinate system having the origin 5. In the example of FIG. 3 the origin 5 is located at the center of a sensor unit 5', which can be a radome. The X-axis is perpendicular to the sensor radome, pointing away from the radome. The coordinate system is right-handed: Y-axis orthogonal to the X-axis and pointing to the right; Z-axis pointing into the page. An (azimuth) angle is defined as in the world coordinate system.

The velocity and the yaw rate of the host vehicle 4 are assumed to be known from sensor measurements known in the art. The over-the-ground (OTG) velocity vector of the host vehicle 4 is defined as:

$$V_h = [u_h v_h]^T,$$

where $u_h$ is the longitudinal velocity of the host vehicle 4 (i.e., the velocity in a direction parallel to the X-axis of the vehicle coordinate system) and $v_h$ is lateral velocity of the host vehicle 4 (i.e., the velocity in a direction parallel to the Y-axis of the vehicle coordinate system).

In this connection it should be noted that the radar detection system 5' comprises an emitter that is configured to send out a radar signal, a plurality of detection channels that are respectively configured to detect radar signals reflected in a field of view of the radar detection system in a single measurement instance, and an evaluation unit (all not shown). The evaluation unit of the radar detection system 5' is configured to resolve multiple points of reflection 6' from the moving target 2 in a single measurement instance, wherein each of the resolved points of reflection 6' is described by data relating to a range $r_i$, an azimuth angle $\theta_i$ and a raw range rate $\dot{r}_i$ of the points of reflection 6' in said single radar measurement instance. The evaluation is further configured to carry out a method of estimating a velocity magnitude as discussed in the following respectively an object hypothesis algorithm that is compiled to carry out such a method of estimating a velocity magnitude.

The sensor mounting position and boresight angle with respect to the vehicle coordinate system are assumed to be known with respect to the vehicle coordinate system (VCS), wherein the following notations are used (see also FIG. 9 in this regard):

$x_{s,VCS}$—sensor mounting position with respect to longitudinal (X-) coordinate $y_{s,VCS}$—sensor mounting position with respect to lateral (Y) coordinate $\gamma_{s,VCS}$—sensor boresight angle.

The sensor over-the-ground (OTG) velocities can be determined from the known host vehicle velocity and the known sensor mounting position. It is understood that more than one sensor 5' can be integrated into one vehicle 4 and specified accordingly.

The sensor OTG velocity vector is defined as:

$$V_h = [V_{h,VCS}{}^x \, V_{h,VCS}{}^y]^T$$

with: $V_{h,VHS}{}^x$ being the sensor longitudinal velocity and $V_{h,VCS}{}^y$ being the sensor lateral velocity $\varphi$.

Similarly the sensor(s) OTG velocities are assumed to be known, as they can be determined from the host vehicle motion and the sensor mounting positions, such that the sensor velocity vector is:

$$V_s = [V_s{}^x \, V_s{}^y]^T$$

with: $V_s{}^x$ being the sensor longitudinal velocity and $V_s{}^y$ being the sensor lateral velocity.

At each radar look (or single measurement instance), the sensor 5' captures m raw points of reflection 6' from the target 2. Each raw detection is described by the following parameters expressed in the sensor coordinate system:

$r_i$—range (or radial distance)

$\theta_i$—azimuth angle $\dot{r}_i$—raw range rate (or radial velocity)

i=1, . . . , m.

Following this the target planar motion can be equivalently described by the target yaw rate and center of rotation (with targets 2 having non-zero yaw rate)

$$V_{t,COR} = [\omega_t x_{t,COR} y_{t,COR}]^T$$

with: $\omega_t$ being the target yaw rate, $x_{t,COR}$ being the longitudinal coordinate of the center of target's rotation and $y_{t,COR}$ being the lateral coordinate of the center of target's rotation.

Figure 5:
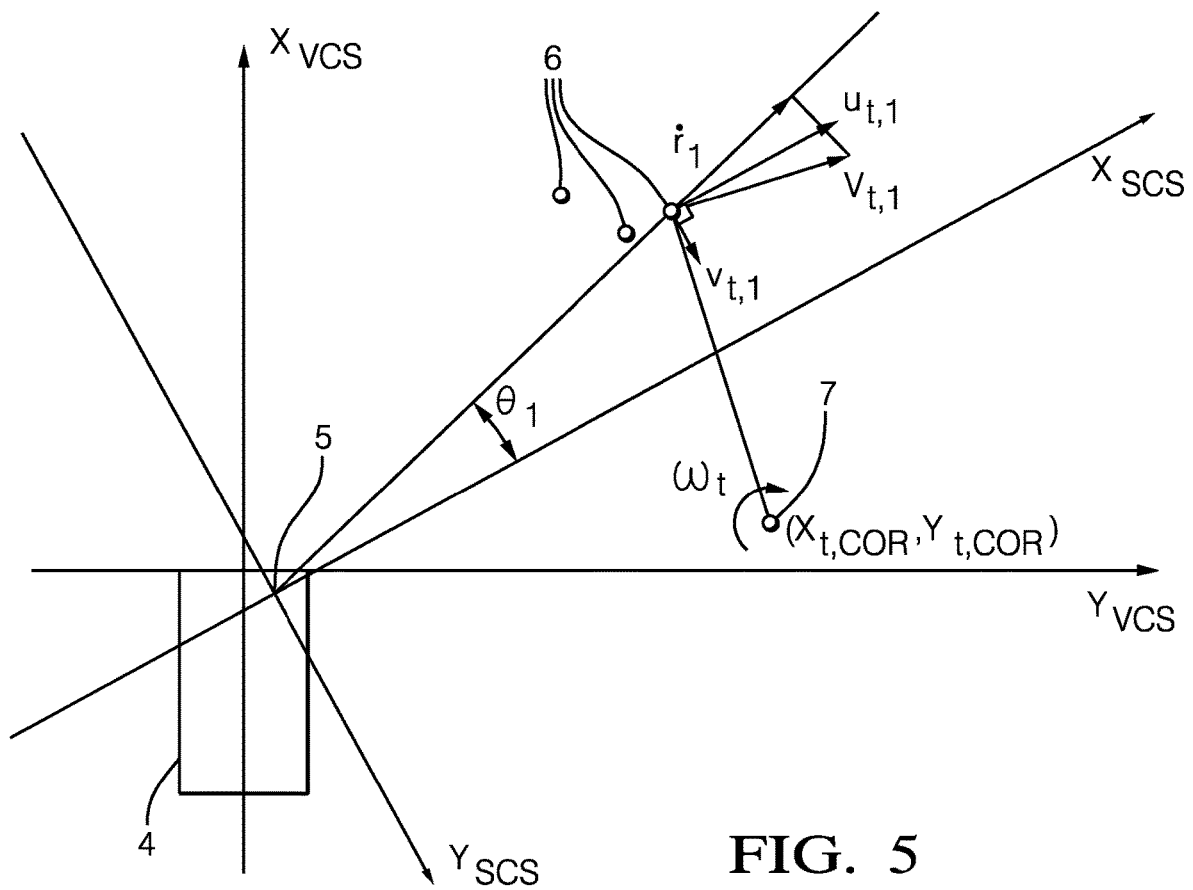
FIG. 5 illustrates principles of calculating velocity vectors at the location of a point of reflection.

FIG. 5 shows a velocity vector at the location of raw detections 6' captured from a rigid body target 2. The center 7 of rotation of the target 2 is also indicated.

Figure 6:
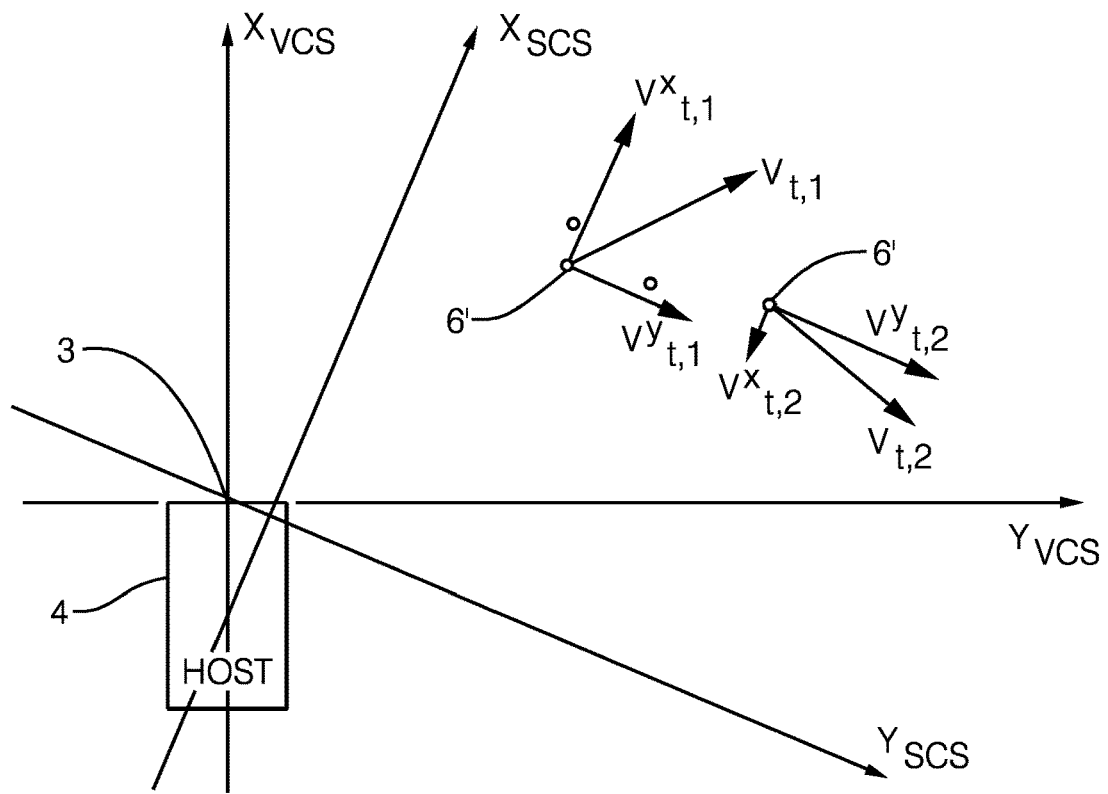
FIG. 6 shows longitudinal and lateral components of the velocity vectors for two points of reflection of the target.

FIG. 6 shows longitudinal and lateral components of the velocity vectors for two points of reflection 6' of the target 2. The longitudinal and lateral velocity components for each point of rigid body can be described as $$\overline{V}_{t,i} = [V_{t,i}{}^x \, V_{t,i}{}^y]^T$$

with: $\overline{V}_{t,i}$ being the velocity vector of i-th point of rigid body, $V_{t,i}{}^x$ being the longitudinal velocity of i-th point of rigid body and $V_{t,i}{}^y$ being the lateral velocity of i-th point of rigid body.

Figure 7:
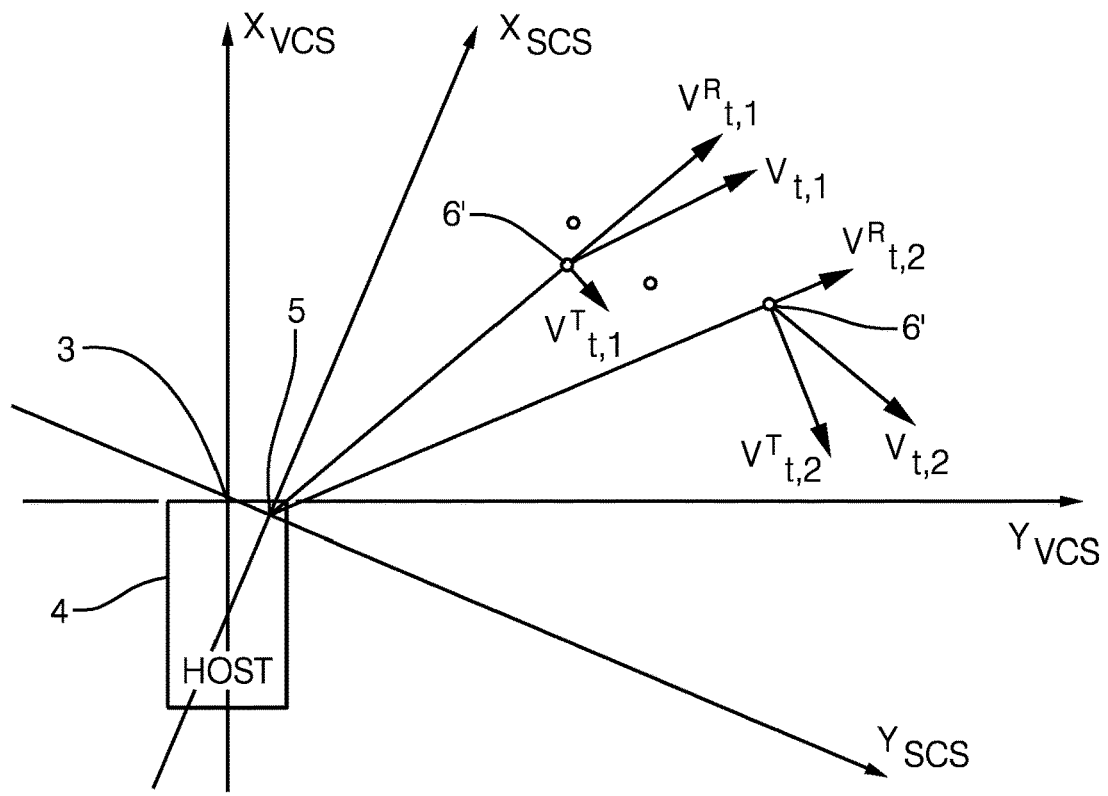
FIG. 7 shows radial and tangential components of the velocity vector for two points of reflection of the target.

FIG. 7 shows radial and tangential components of the velocity vector for two points 6' of detection of the target 2.

The radial and tangential velocity components for each point of rigid body can be described as:

$$\overline{V}_{t,i} = [V_{t,i}{}^R \, V_{t,i}{}^T]^T$$

with: $V_{t,i}{}^R$ being the longitudinal velocity of i-th point of rigid body and $V_{t,i}{}^T$ being the lateral velocity of i-th point of rigid body.

Figure 8:
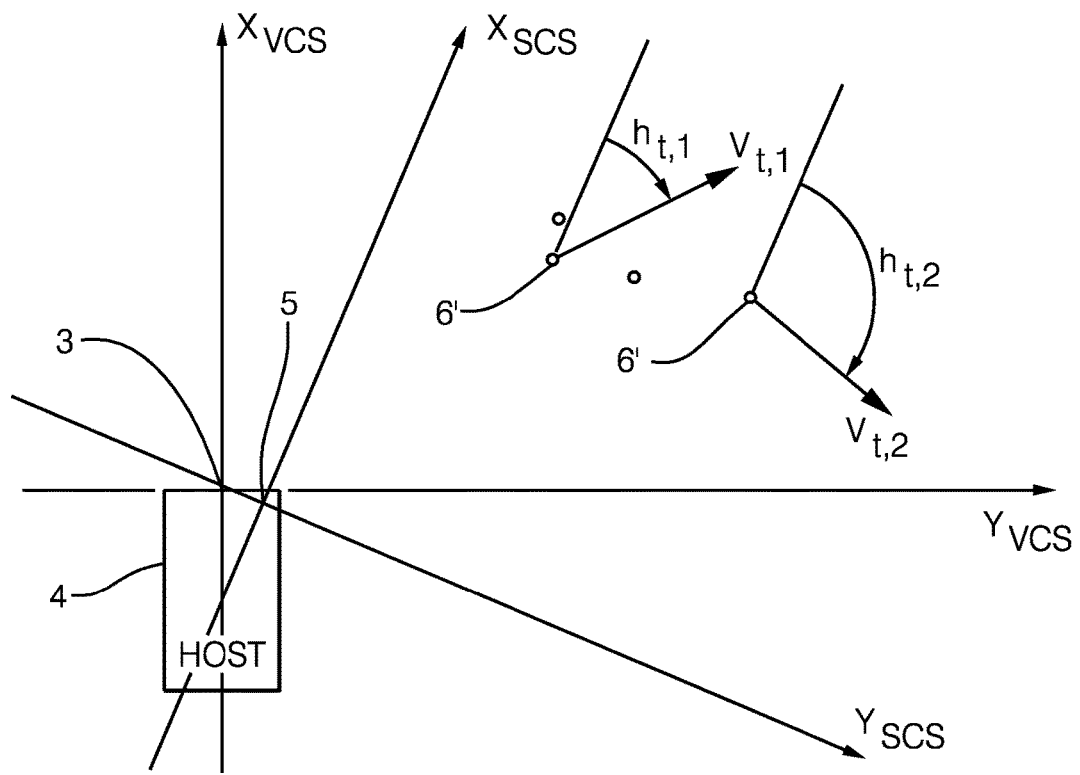
FIG. 8 shows a heading of velocity vector for two points of reflection of the target.

FIG. 8 shows a heading of velocity vector for two points 6' of detection of the target 2. The heading and velocity magnitude for each point of rigid body can be described as:

$$\overline{V}_{t,i} = [h_{t,i} V_{t,i}]^T$$

with: $h_{t,i}$ being the heading of i-th point of rigid body and $V_{t,i}$ being the velocity magnitude of i-th point of rigid body.

In the case of straight moving targets 2 (i.e. the yaw rate of the target 2 is equal to zero), the velocity vector for each point of reflection 6' of the rigid body is the same and is described as:

$$\overline{V}_{t,i} = \overline{V}_{t,j} = \overline{V}_t, \text{ for all } i \text{ and } j.$$

Figure 9:
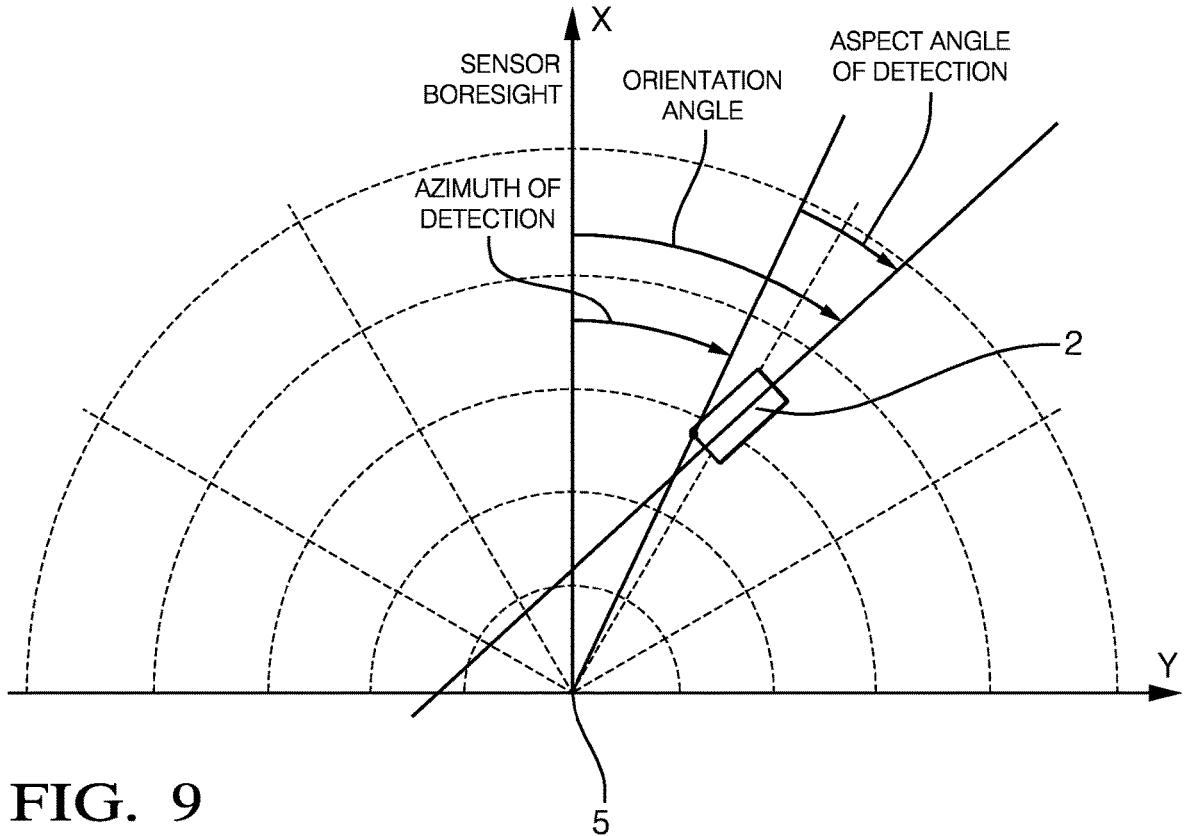
FIG. 9 shows a drawing describing the aspect angle of detection.

FIG. 9 shows a drawing describing the aspect angle of detection. The orientation of the target 2 is denoted by $\gamma_t$. The aspect angle is defined as a difference between orientation angle and azimuth angle of the point of the interest:

$$\alpha_{a,i} = \gamma_t - \theta_i$$

The sensor boresight is aligned with the X-axis of the sensor 5', i.e. it intersects with the origin 5 (see FIG. 3). The orientation angle, the azimuth of detection and the aspect angle of detection are all determined relative to the sensor boresight as indicated by the respective arrows that extend between the X-axis and the Y-axis and that end at points in the X-Y plane relative to the target 2.

The range rate equation for a single raw detection can be expressed as follows:

$$\dot{r}_i + V_s{}^x \cos\theta_i + V_s{}^y \sin\theta_i = V_{t,i}{}^x \cos\theta_i + V_{t,i}{}^y \sin\theta_i$$

wherein $\dot{r}_i$ represents the range rate, i.e., the rate of change of the distance between the origin of the sensor coordinate system and a detection point 6, as illustrated in FIG. 5. The location of the detection point 6 can be described by the azimuth angle $\theta_{i=1}$ and the value of the radial distance $r_{i=1}$ (range of detection point, i.e. distance between origin and the detection point).

To simplify the notation, the notion of a compensated range rate is introduced and defined as:

$$\dot{r}_{i,cmp} = \dot{r}_i + V_s{}^x \cos\theta_i + V_s{}^y \sin\theta_i$$

with: $\dot{r}_{i,cmp}$ representing the range rate of the i-th raw detection compensated for the velocity of the host vehicle 4. The compensated range rate can also be expressed as:

$$\dot{r}_{i,cmp} = V_{t,i}{}^x \cos\theta_i + V_{t,i}{}^y \sin\theta_i.$$

The range rate equation can be expressed in vector form as:

$$\dot{r}_{i,cmp} = [\cos\theta_i \; \sin\theta_i] \begin{bmatrix} V_{t,i}{}^x \\ V_{t,i}{}^y \end{bmatrix}.$$

Similarly the range rate equation in vector form with two components can be expressed as:

$$\dot{r}_{i,cmp} = [\cos\theta_i \; \sin\theta_i] \begin{bmatrix} c_t \\ s_t \end{bmatrix}$$

with: $c_t$ being the longitudinal component of the solution of the range rate equation and $s_t$ being the lateral component of the solution of the range rate equation. It should be noted that the coefficients $c_t$, $s_t$ are preferably invariant with respect to the azimuth angle at least for a range of azimuth angles corresponding to the location of the target 2 to which a plurality of detection points 6 refer and on which basis the coefficients have been determined.

This means that the velocity profile equation is assumed to be valid not only for specific points of reflection 6' but for a range of azimuth angles. Therefore, the range rate can readily be determined for any azimuth angle from a specific angle range using the range rate equation.

As the skilled person understands, in practice, the "true" coefficients $c_t$, $s_t$ can only be estimated from a plurality of detection points. These estimates are denoted $\tilde{c}_t$ and $\tilde{s}_t$ and are estimated using an iteratively (re-) weighted least squares methodology.

In the present teaching the velocity profile is used as a synonym of the components of the range rate equation and can be expressed as:

$$\overline{VP} = \begin{bmatrix} c_t \\ s_t \end{bmatrix},$$

with $\overline{VP}$ being the velocity profile. It should be noted that estimated values are denoted with a hat, least square solutions are denoted with a tilde and vectors are denoted with a line.

In order to carry out the detection of the velocity magnitude several conditions have to be satisfied. These conditions comprise at least some of the following:
- several raw detections from the same target 2 should be recorded as points of reflection 6' (it is preferable if at least two, more specifically at least three and especially preferable if at least four such raw detections are made to produce two, three, four or more points 6' of detection in the following);
- each raw detection is preferably attributed with a position in the sensor FOV (field of view) that comprises polar (azimuth angle—$\theta_i$, range—$r_i$) components and the range rate $\dot{r}_i$;
- a cluster containing a set of points 6' of detections from the same target 2 (the set comprising at least one and preferably at least two points 6' of detections) should be detected;
- the accuracy of detection attributes is assumed to be known, with the azimuth angle accuracy being $\sigma_\theta$ and the range rate accuracy being $\sigma_{\dot{r}}$;
- the orientation angle is estimated as $\gamma_t$;
- the uncertainty of orientation angle is estimated as $\sigma_{\gamma_t}$;
- and/or the information that a velocity estimation not available or not plausible.

The teaching presented herein thereby provides an improved method of estimating the velocity magnitude of the extended target 2, which includes the valid estimation of the orientation angle and takes into account invalid motion estimations. Before summarizing the invention the prior art will initially be discussed to provide an overview and an introduction to the subject matter presented herein.

Prior Art a. Enhanced Oriented Bounding Box

An algorithm for a geometrical approach to the estimation of the orientation of extended radar targets has previously been considered. In this approach the proposed solution does not rely on time filtering and works only on a single radar measurement. The algorithm is based on a version of the rotating calipers algorithm. The solution of this algorithm relies on the determination of a convex hull that includes all detections assigned to a single target. The bounding box is spread to extreme values of Euclidian positions of its point detections and then it is rotated so that in each step it is collinear with one side of the convex hull.

An enhancement of this method ignores consecutive convex hull points iteratively, because erroneous detections may lie outside the vehicle and may not reflect the actual shape of bounding box.

For each fitted bounding box the quality factor is evaluated by means:
- the size of bounding box, which should be as small as possible;
- the distance of each detection to the nearest side of resulting target OBB. Such distances are summed over all detections and minimized. The distance to the nearest side has to be calculated differently for inliers and outliers.

As an alternative algorithm for the same task a brute-force algorithm was also considered. In this alternative it was demonstrated that the solution works for an estimation of the orientation for vehicles represented by OBB (Oriented Bounding Box). Again, the OBBs were estimated using Euclidean position of detections from a single radar measurement. The main drawback of that solution is a significant computation time and a requirement for a relatively high number of detections captured from target vehicle.

b. Others Algorithms for Oriented Bounding Box Estimation.

There are several different algorithms for estimating object orientation. They are also based on geometrical alignment of detections in Euclidian coordinate system, e.g.: L-fit, Hough transform.

c. Cloud Algorithm

The case of a straight-line moving distributed target has also been considered. This restriction simplifies the estimation problem as the velocity vectors at the location of each raw detections are identical, i.e.:

$$\overline{V}_{t,i} = [V_{t,i}^x \ V_{t,i}^y]^T = [V_t^x \ V_t^y]^T = \overline{V}_t \text{ for } i=1,\ldots,m$$

To this effect the Cloud Algorithm (CA) was proposed to estimate over-the-ground lateral $v_t$ and longitudinal $u_t$ velocity of the "cloud" of detections captured from the same target.

This was achieved by Least Square solution to the problem defined as follows:

$$\dot{r}_{i,cmp} = [\cos\theta_i \ \sin\theta_i] \begin{bmatrix} V_t^x \\ V_t^y \end{bmatrix}$$

The algorithm proved to be a very effective technique for instantaneous estimation of target velocity.

In a similar manner the same problem and the same theoretical basis for the estimation of lateral velocity of a straight line moving object was considered. In that example an enhancement of the Cloud Algorithm was proposed by means of:
- executing RANSAC algorithm to identify outliers
- executing orthogonal distance regression (ODR) to solve error-in-variables problem for a modified formulation of the original problem.

In this solution the improved robustness of the algorithm is presented in comparison to the original Cloud Algorithm solution. However, computational complexity and the requirement to solve an optimization problem are the major drawbacks of the proposed approach, especially when an application in a production embedded system is to be considered.

d. Cloud Algorithm Solution for Yawing Targets

Further work has taken place in which the cloud algorithm was applied to the estimation of target's motion without the restriction on straight-line path was investigated. Such a situation is shown in FIG. 5. The over-the-ground velocity vectors at the location of each detection are determined as follows:

$$\begin{bmatrix} V_{t,i}^x \\ V_{t,i}^y \end{bmatrix} = \begin{bmatrix} (y_{t,COR} - y_{t,i})\omega_t \\ (x_{t,i} - x_{t,COR})\omega_t \end{bmatrix}.$$

The range rate equation for each raw detection was derived to be:

$$\dot{r}_{i,cmp} = (y_{t,COR} - y_{t,i})\omega_t \cos\theta_i + (x_{t,i} - x_{t,COR})\omega_t \sin\theta_i$$

This equation can be reduced since:

$$y_{t,i} \cos\theta_i = r_{t,i} \sin\theta_i \cos\theta_i = x_{t,i} \sin\theta_i, \text{ and}$$

$$\dot{r}_{i,cmp} = (y_{t,COR})\omega_t \cos\theta_i + (-x_{t,COR})\omega_t \sin\theta_i.$$

It should be noted in this connection that the range measurement does not appear in the above equation, thus it is not required for the velocity estimation.

It was then shown that the Least Square solution to this problem results in:

$$\tilde{c}_t = (y_{t,COR})\omega_t$$

$$\tilde{s}_t = (-x_{t,COR})\omega_t$$

$$\dot{r}_{i,cmp} = [\cos\theta_i \quad \sin\theta_i] \begin{bmatrix} c_t \\ s_t \end{bmatrix}$$

The estimator of the velocity of the i-th detection is:

$$V_{t,i}^x = \tilde{c}_t + (-y_{t,i})\omega_t$$

$$V_{t,i}^y = \tilde{s}_t + (x_{t,i})\omega_t$$

Although the Least Square solution does not estimate the velocity vector itself, it can still be treated as a biased velocity vector estimator in case of yawing target. Thus, velocity profile estimation can be used as a valuable information for velocity vector estimation in both cases: straight-line moving and turning target.

e. Inverse Variance Weighted Mean

In statistics, the use of inverse-variance weighting is a method of aggregating two or more random variables to minimize the variance of the weighted average. In such methods each random variable is weighted in inverse proportion to its variance:

$$\hat{\mu}_x = \frac{\sum_i \frac{x_i}{\sigma_i^2}}{\sum_i \frac{1}{\sigma_i^2}}$$

where
$\hat{\mu}_x$—Estimated mean of sample
$x_i$—Single sample
$\sigma_i^2$—Variance of single sample The main advantage of variance is that samples with higher uncertainty have lower influence on the estimation.

To work correctly each sample variance has to be known or at least estimated. If sample uncertainty is not known or cannot be estimated then inverse-variance weighting cannot be applied. If each sample variance is equal then equation is reduced to simple sample mean. Furthermore, if the sample variance does not vary a lot, the advantages of using inverse-variance weighting is questionable.

Restriction and Limitations to Prior Art

However, the following restrictions and limitations exist with respect to the prior art. The velocity vector is usually estimated using the Cloud Algorithm (velocity profile). The problem with this estimation is that it is a valid velocity estimation only in the case of straight moving targets. But even for some straight moving targets, the distribution of detections may be such that the estimate cannot be treated as reliable.

Additionally, when the target is maneuvering the Velocity Profile solution cannot be treated as velocity estimation. It can only be treated as a biased velocity estimation, but usually it is completely unreliable. Velocity can only be plausibly calculated if the yaw rate of the target is reliably estimated. This is rarely possible using automotive Doppler radars.

On the other hand, when some conditions are met, the orientation of the target can be estimated from a spatial distribution of extended target raw detections. Thus, cases exist where the velocity estimation based on the velocity profile is unreliable and an orientation estimation is reliable. In these cases a position, an orientation and a dimension can be estimated, but the velocity is not estimated (as it is unreliable) in which case the information which comes from the range rates measurements is then completely ignored.

PRESENT INVENTION

In the proposed algorithm for the velocity estimation discussed herein the following case is proposed and discussed in detail:

The contribution of the present invention includes:
an algorithm for velocity estimation of extended target, and
an algorithm for variance estimation for estimated velocity The features of this invention are that the velocity can be estimated even when the velocity estimated by other algorithms is unreliable, the known measurement accuracy is incorporated in the invention to improve the velocity estimation.

Moreover, an estimated orientation uncertainty can be incorporated to improve the velocity estimation. Thereby the availability of the velocity estimation is improved. The approach taken in principle does not require any filtering/tracking to take place. The algorithm is suitable for application in production embedded systems because of its low computational complexity which leads to a reduced computational time in comparison to prior art methods and hence makes this method more facile than prior art methods. Moreover, an estimation of the yaw rate estimation is not required which further reduces the computational demand in effort and cost.

The method of the invention of estimating a velocity magnitude of a moving target 2 in a horizontal plane is based on using radar signals received by a radar detection system 5'.

The radar system 5' includes a radar sensor unit that is arranged at the front bumper 3 in FIG. 3 having the origin 5 and that is adapted to receive signals emitted from said host vehicle 4 and reflected by said target 2. The radar sensor unit 5' also known as a radar detection system 5' is configured to resolve multiple dominant points of reflection 6' from the moving target 2 in a single measurement instance. Each of the resolved points of reflection 6' is described by data relating to the range $r_i$, the azimuth angle $\theta_i$ and the raw range rate $\dot{r}_i$ of the points of reflection 6' in said single radar measurement instance.

The method comprises the following steps:

In order to carry out the invention the heading angle is assumed to be the same as the orientation angle in step 1. The heading angle can be expressed as follows:

$$h_t = \gamma_t$$

In Step 2 the estimate of the target 2 velocity magnitude is calculated as a weighted mean of multiple estimates $V_{t,i}$—that are estimated from each range rate $\dot{r}_i$ and azimuth $\theta_i$ from the points of reflection 6' and heading angle, with the heading angle being the assumed value. The multiple estimates can be expressed as:

$$\hat{V}_t = \frac{\sum_i^n V_{t,i} w_{V,i}}{\sum_i^n w_{V,i}}$$

These measurements are performed in one single radar measurement instance and are based on estimated points of reflections 6' that satisfy a predetermined condition. The one condition may be that the range rate measurements are deemed to be valid range rate measurements. Thus, said resolved points of reflection 6' of said range rate are verified prior to the step of calculating the velocity magnitude as a weighted mean of estimates.

Step 2 comprises sub step 2.1, in which each detection of the point of reflection 6' is validated to see if the velocity magnitude can be plausibly estimated. It is found that the detection is valid if e.g.

$$|\cos \alpha_{a,i}| < k_{min\_cos\_aspect\_angle}.$$

In sub step 2.2 the velocity magnitude of the target 2 can be calculated as a single estimate of the velocity magnitude of the target 2 as:

$$V_{t,i} = \frac{\dot{r}_{i,cmp}}{\cos\alpha_{a,i}},$$

where $\dot{r}_{i,cmp}$ is the range rate compensated for the i-th raw detection.

In sub step 2.3—the important design step—during the step of estimating the weighted means of estimates, the weights are selected as an inverse of estimated variance for a corresponding estimate. This can be expressed as:

$$w_{V,i} = \frac{1}{\sigma_{V_{t,i}}^2},$$

where $\sigma_{V_{t,i}}^2$ is a variance of the considered velocity magnitude estimate.

From this the variance of a single velocity magnitude estimate can be calculated using an uncertainty propagation. The uncertainty propagation can satisfy the following condition:

$$\sigma_{V_{t,i}}^2 = V_{t,i}^2 \left( \frac{\sigma_{\dot{r}_{i,cmp}}^2}{\dot{r}_{i,cmp}^2} + \frac{\sigma_{\cos\alpha_{a,i}}^2}{\cos^2\alpha_{a,i}} \right)$$

In this connection it should be noted that the estimation of the variance of the estimated velocity magnitude can be based on the assumption that the heading variance should be higher than the estimated orientation variance. The heading variance can differ from the orientation angle and this can be expressed as:

$$\hat{\sigma}_{h_t}^2 = \sigma_{\gamma_t}^2 + k_{heading\_var\_exceed}$$

Simplifying the above equations, the uncertainty propagation, i.e. the final weight equation can be expressed as:

$$w_{V,i} = \frac{\cos^4\alpha_{a,i}}{\cos^2\alpha_{a,i}\sigma_{\dot{r}_{i,cmp}}^2 + \dot{r}_{t,i}^2 \sigma_{\cos\alpha_{a,i}}^2}.$$

In step 3 a variance estimation of an estimated velocity magnitude can take place. The variance estimation of the estimated velocity magnitude can be estimated using weights. The weights can be expressed as:

$$\hat{\sigma}_{\hat{V}_t}^2 = \frac{n}{\sum_i^n w_{V,i}}$$

In step 4 a plausibility check for the estimated velocity magnitude can take place. This plausibility check is applied in order to reduce the number of unreliable estimations. It has been found that the simplest plausibility check is based on an estimated variance of the velocity magnitude. In this connection the estimated variance is assumed to satisfy a condition. This condition can be expressed as:

If $\hat{\sigma}_{\hat{V}_t}^2 < k_{max\_magnitude\_var}$ then the velocity estimate can be treated as plausible.

Implementation Example

The proposed algorithm was implemented in a vehicle in order to assess the performance of an object hypotheses algorithm. The proposed object hypotheses algorithm is used for velocity estimation in case of valid orientation estimation and invalid velocity estimation.

Figure 10:
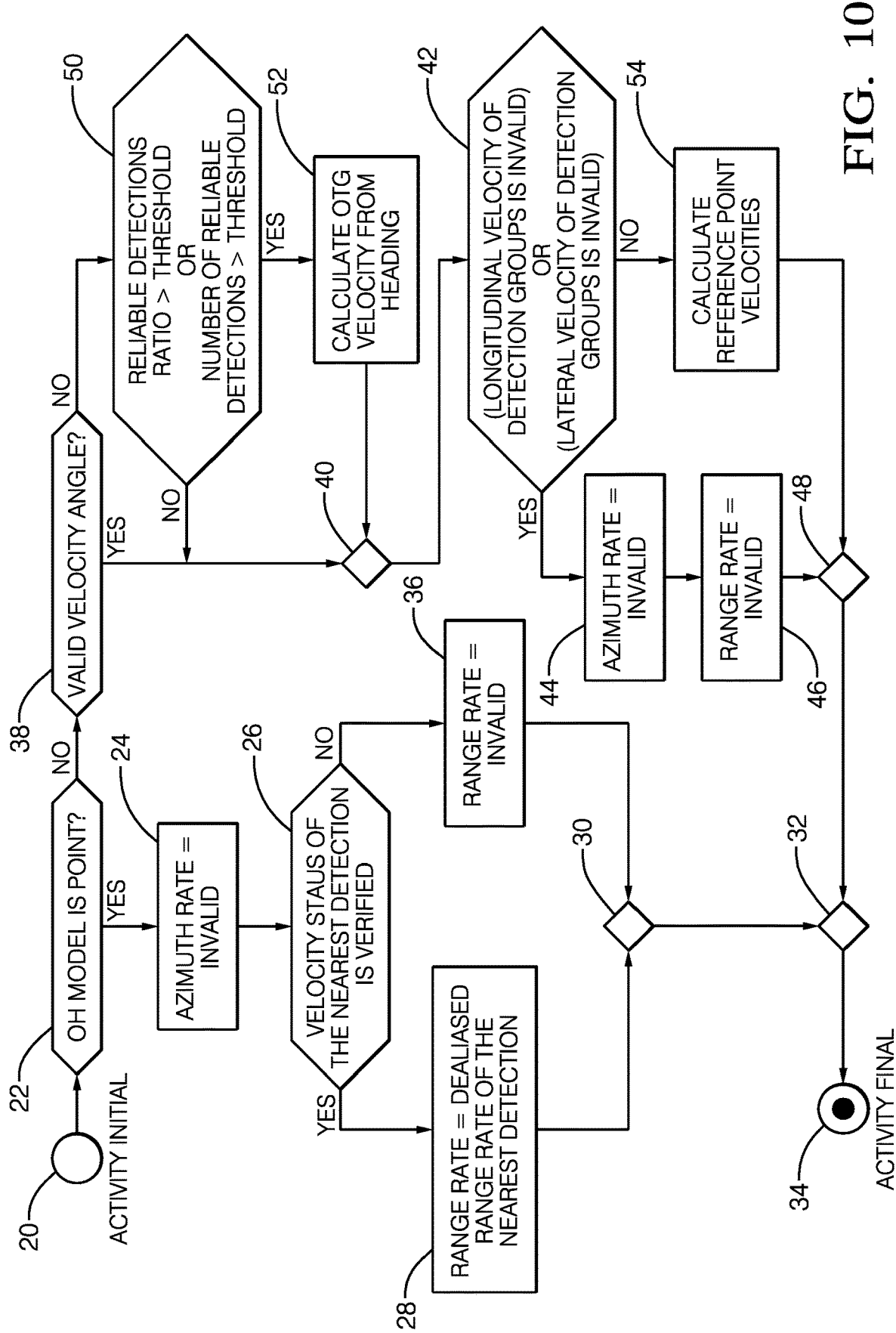
FIG. 10 shows a process flow for an object hypotheses velocity run algorithm.

FIG. 10 shows a flow chart indicated the steps of the process flow of the object hypotheses velocity run algorithm that can be implemented in the evaluation unit of the radar detection system 5'. The process starts at box 20 at box 22 a decision is made whether the object hypotheses model is a point model or not.

If the decision is made that the object hypotheses model is a point model, then a decision is made at box 24 whether the azimuth rate is invalid.

If this is the case then a velocity status of the nearest detection is verified at box 26. If a decision is made that the velocity status of the nearest detection is verified then a decision is made at box 28 that the range rate is the same as the dealiased range rate of the nearest detection.

This information is passed on to the box 30 that outputs corresponding information to box 32 which is the node point for all decisions and determinations of the object hypotheses velocity run algorithm that are generally output at box 34.

If the decision is made that the velocity status of the nearest detection cannot be verified at box 26 then a decision is made at box 36 that the range rate is invalid. This information is passed on to the box 30 that outputs corresponding information to box 32 which is the node point for all decisions and determinations of the object hypotheses velocity run algorithm that are generally output at the box 34.

If the decision is made that the object hypotheses model is not a point model at box 22, then a determination is made at box 38 whether the velocity angle is valid. If this is the case then this information is passed to box 40 that further forwards this information to box 42.

At box 42 a decision is made whether one of the longitudinal velocity of detection group and the lateral velocity of detection group is invalid. If this is the case the process moves on to box 44 where a determination is made that the azimuth rate is invalid. This information is forwarded to box 46 where a decision is made that the range rate is invalid. This information is forwarded to box 48 that in turn forwards the information to the box 32 for final output at the box 34.

If a decision is made at the box 38 that the velocity angle is not valid then this information is passed on to box 50 where a decision is made to see whether the number of reliable detections is above a desired threshold value or not or whether the ratio of the reliable detections is above a certain threshold or not. If the determination is made that the reliable detections or the ratio of reliable detections is below the desired threshold then this information is passed to the box 40 that further forwards this information to the box 42.

If the determination is made that the reliable detections or the ratio of reliable detections is above the desired threshold then this information is passed to box 50 in order to calculate the over the ground velocity OTG from the heading angle. The result of this calculation is then forwarded to box 40 that further forwards this information to box 42.

If at the box 42 a decision is made that one of the longitudinal velocity of detection group and the lateral velocity of detection group is valid then corresponding reference point velocities are calculated at box 54. This information is then passed on to box 48 for output at the box 34.

The performance of the proposed object hypothesis algorithm was evaluated with reference data. For this purpose 500 test cases were executed with different road scenarios.

Tables 1 and 2 present the statistics of the velocity availability. In comparison to prior art velocity magnitude estimates, the number of invalid velocity estimation was reduced by more than 10 times using the proposed algorithm.

Table 1 shows the number of samples used for different velocity estimation algorithms.

TABLE 1

|  | Velocity Profile | Proposed algorithm | Velocity invalid |
| --- | --- | --- | --- |
| Number of samples | 20666 | 2113 | 198 |
| Percent of samples [%] | 89.9 | 9.2 | 0.8 |

Table 2 shows the availability of velocity estimation with and without algorithm.

TABLE 2

|  | Valid | Invalid |
| --- | --- | --- |
| Without proposed algorithm | 20666 [89.9%] | 2311 [10%] |
| With proposed algorithm | 22779 [99.2%] | 198 [0.8%] |

Figure 11:
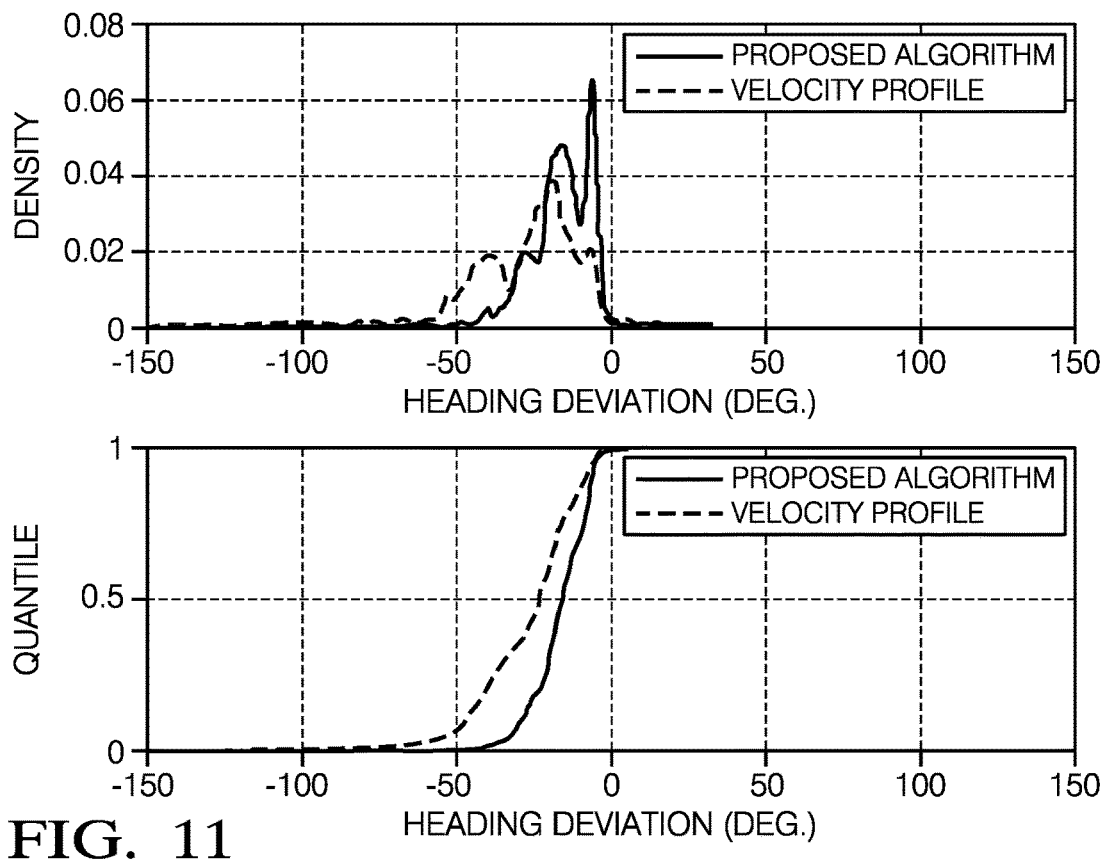
FIG. 11 shows a heading deviation comparison of proposed algorithm and velocity profile estimates in the case of not plausible velocity profile estimations.

FIG. 11 shows a heading deviation comparison of the proposed algorithm (solid line) and velocity profile estimates (dashed line) in case of non-plausible velocity profile estimations.

Figure 12:
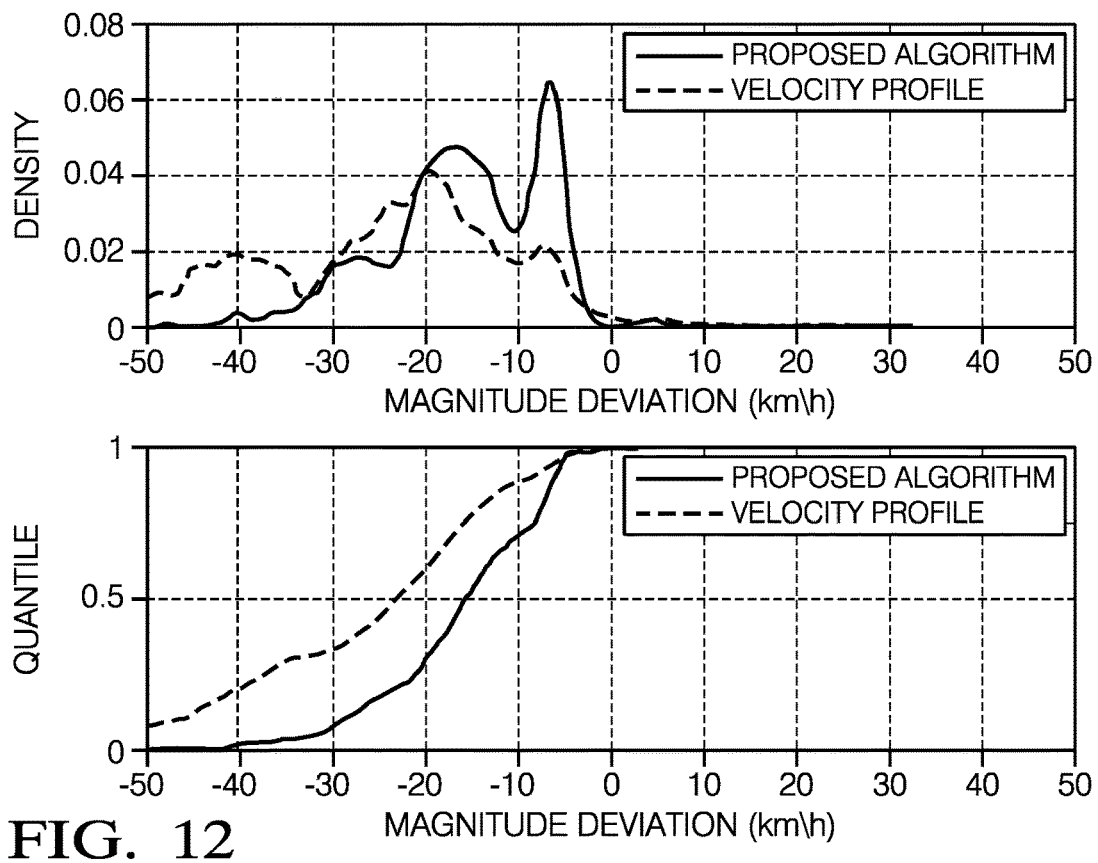
FIG. 12 shows a magnitude deviation comparison of proposed algorithm and velocity profile estimates in the case of non-plausible velocity profile estimations.

FIG. 12 shows a magnitude deviation comparison of proposed algorithm (solid line) and velocity profile estimates (dashed line) in case of not plausible velocity profile estimations.

In FIGS. 11, 12 and in table 3 the accuracy of the algorithm is presented. To compare accuracy performance velocity profile estimates were used on the corresponding samples. It should be noted that the velocity profile estimates were previously classified as not reliable, so presented statistics illustrate situation when no plausibility checks would be applied for the velocity profile and proposed algorithm would not be implemented.

As indicated the accuracy improvement for these samples is significant and it is believed that this algorithm works significantly better than initial intuition of the inventors would have expected.

It should further be noted that this estimation is achieved using less computing power than was previously used for less reliable estimations such as those suggested in the prior art. One of the main reasons for this is that the velocity magnitude can be estimated using a single radar detection system 5' in only one single radar measurement instance.

Table 3 shows an accuracy comparison of proposed algorithm and velocity profile estimates in case of non-plausible velocity profile estimations.

TABLE 3

| RMS | Velocity Profile | Proposed algorithm |
| --- | --- | --- |
| Heading [deg] | 101 | 19 |
| Magnitude [km/h] | 32 | 18 |

While this invention has been described in terms of the preferred embodiments thereof, it is not intended to be so limited, but rather only to the extent set forth in the claims that follow.

We claim:

1. A method of estimating a velocity magnitude of a moving target in a horizontal plane using one or more radar signals received by a radar detection system implemented, at least in part, by a computing device, the method comprising:

emitting, using an emitter of the radar detection system, a radar signal;

receiving, using the radar detection system, a reflected version of the radar signal as a plurality of received radar signals based on the radar signal reflecting off the moving target;

detecting, by the radar detection system and in a single measurement instance, multiple points of reflection on the moving target using the plurality of received radar signals;

determining, by the radar detection system, multiple resolved points of reflection by resolving, in the single measurement instance, the multiple points of reflection from the moving target, each resolved point of reflection of the multiple resolved points of reflection being described by data including: a range, an azimuth angle, and a raw range rate; and responsive to determining that a heading angle for each of the resolved points of reflection equates to an orientation angle of said moving target, calculating, by the radar detection system and in the single measurement instance, the velocity magnitude of said moving target in the horizontal plane as a weighted mean of multiple estimates calculated using the raw range rate and azimuth angle from at least some of the multiple resolved points of reflection and heading angle.

2. The method in accordance with claim 1, further comprising:

verifying, prior to calculating the velocity magnitude, said multiple resolved points of reflection by determining resolved points of reflections of the multiple resolved points of reflection that satisfy a predetermined condition, wherein calculating the velocity magnitude further comprises calculating the velocity magnitude based on the resolved points of reflection that satisfy the predetermined condition.

3. The method in accordance with claim 1, wherein an estimate of the target velocity magnitude as a weighted mean of estimates ($\hat{V}_t$) is estimated using points of reflection with a raw range rate satisfying the below equation:

$$\hat{V}_t \propto \frac{\sum_i^n V_{t,i} w_{V,i}}{\sum_i^n w_{V,i}},$$

wherein $V_{t,i}$ is a single target velocity magnitude estimate for an i-th point of reflection of the multiple points of reflection, and $w_{V,i}$ is a weight associated with the target velocity magnitude estimate of the i-th point of reflection.

4. The method in accordance with claim 3, wherein $$\hat{V}_t = \frac{\sum_i^n V_{t,i} w_{V,i}}{\sum_i^n w_{V,i}}.$$

5. The method in accordance with claim 1, further comprising:

determining, for each point of reflection of the multiple points of reflection, whether to use the point of reflection to estimate the velocity magnitude by verifying if the point of reflection satisfies a condition.

6. The method in accordance with claim 5, wherein an i-th point of reflection of the multiple points of reflection is found to be valid if the following condition is satisfied:

$$|\cos \alpha_{a,i}| > k_{min\_cos\_aspect\_angle},$$

where $\alpha_{a,i}$ is the aspect angle for the i-th point of reflection and is defined as a difference between the orientation angle and the azimuth angle of the i-th point of reflection, and $k_{min\_cos\_aspect\_angle}$ is a threshold value.

7. The method in accordance with claim 1, wherein a single estimate of the velocity magnitude of the target ($V_{t,i}$) for an i-th point of reflection of the multiple points of reflections is calculated as:

$$V_{t,i} \propto \frac{\dot{r}_{i,cmp}}{\cos \alpha_{a,i}},$$

wherein $\dot{r}_{i,cmp}$ is the raw range rate compensated for the i-th point of reflection, and wherein $\alpha_{a,i}$ is the aspect angle and is defined as a difference between the orientation angle and the azimuth angle of the i-th point of reflection.

8. The method in accordance with claim 7, wherein $$V_{t,i} = \frac{\dot{r}_{i,cmp}}{\cos \alpha_{a,i}}.$$

9. The method in accordance with claim 1, wherein calculating the velocity magnitude of the moving target as the weighted mean of multiple estimates further comprises:

selecting the weights as an inverse of an estimated variance for a corresponding estimate, wherein the weight associated with an estimate satisfies the following equation:

$$w_{V,i} \propto \frac{1}{\sigma_{V_{t,i}}^2},$$

wherein $V_{t,i}$ is a single target velocity magnitude estimate for an i-th point of reflection of the multiple points of reflection, $w_{V,i}$ is a weight associated with the target velocity magnitude estimate of the i-th point of reflection, and $\sigma_{V_{t,i}}^2$ is a variance of the target velocity magnitude estimate of the i-th point of reflection.

10. The method in accordance with claim 9, wherein $$w_{V,i} = \frac{1}{\sigma_{V_{t,i}}^2}.$$

11. The method in accordance with claim 9, wherein a variance of the single velocity magnitude estimate can be calculated using an uncertainty propagation.

12. The method in accordance with claim 11, wherein the uncertainty propagation satisfies the following condition:

$$\sigma_{V_{t,i}}^2 = V_{t,i}^2 \left( \frac{\sigma_{\dot{r}_{i,cmp}}^2}{\dot{r}_{i,cmp}^2} + \frac{\sigma_{\cos \alpha_{a,i}}^2}{\cos^2 \alpha_{a,i}} \right),$$

with: $\sigma_{\dot{r}_{i,cmp}} = \sigma_{\dot{r}}$, $\sigma_{\cos \alpha_{a,i}}^2 = \sin^2(\alpha_{a,i}) \sigma_{\alpha_{a,i}}^2$, and $$\sigma_{\alpha_{a,i}}^2 = \hat{\sigma}_{h_t}^2 + \sigma_\theta^2,$$

wherein $\alpha_{a,i}$ is the aspect angle for an i-th point of reflection of the multiple points of reflection and is defined as a difference between the orientation angle and the azimuth angle of the i-th point of reflection, wherein $\sigma_{\alpha_{a,i}}$ is a variance of the aspect angle for the i-th point of reflection;

wherein $\sigma_{\dot{r}}$ is a variance of the raw range rate for the i-th point of reflection, wherein $\dot{r}_{i,cmp}$ is a raw range rate compensated for the i-th point of reflection, wherein $\sigma_{\hat{r}_{i,cmp}}$ is a variance of the raw range rate compensated for the i-th point of reflection, wherein $\hat{\sigma}_{h_t}$ is a target heading variance, and wherein $\sigma_\theta$ is an azimuth angle variance.

13. The method in accordance with claim 12, wherein $$\sigma^2_{V_{t,i}} = V^2_{t,i}\left(\frac{\sigma^2_{\hat{r}_{i,cmp}}}{\hat{r}^2_{i,cmp}} + \frac{\sigma^2_{\cos\alpha_{a,i}}}{\cos^2\alpha_{a,i}}\right),$$

wherein $\sigma_{V_{t,i}}^2$ is a variance of a considered target velocity magnitude estimate for the i-th point of reflection.

14. The method in accordance with claim 12, wherein, for the estimation of the variance of the estimated velocity magnitude, the assumption is made that an estimate of the target heading variance ($\hat{\sigma}_{h_t}^2$) is higher than an orientation variance ($\sigma_{\gamma_t}^2$) and satisfies the condition:

$$\hat{\sigma}_{h_t}^2 \propto \sigma_{\gamma_t}^2 + k_{heading\_var\_exceed},$$

wherein $k_{heading\_var\_exceed}$ is a constant greater than 0.

15. The method in accordance with claim 14, wherein $$\hat{\sigma}_{h_t}^2 = \sigma_{\gamma_t}^2 + k_{heading\_var\_exceed}.$$

16. The method in accordance with claim 9, wherein the uncertainty propagation satisfies the following condition:

$$w_{V,i} \propto \frac{\cos^4\alpha_{a,i}}{\cos^2\alpha_{a,i}\sigma^2_{\hat{r}_{i,cmp}} + \hat{r}^2_{t,i}\sigma^2_{\cos\alpha_{a,i}}},$$

wherein $\alpha_{a,i}$ is the aspect angle for the i-th point of reflection and is defined as a difference between the orientation angle and the azimuth angle of the i-th point of reflection, wherein $\hat{r}_{i,cmp}$ is a raw range rate compensated for the i-th point of reflection, wherein $\sigma_{\hat{r}_{i,cmp}}$ is a variance of the raw range rate compensated for the i-th point of reflection, wherein $\sigma_{\hat{r}}$ is a variance of the raw range rate for the i-th point of reflection, and wherein $\sigma_{\hat{r}_{i,cmp}}^2 = \sigma_{\hat{r}}^2$, $\sigma_{\cos\alpha_{a,i}}^2 = \sin^2(\alpha_{a,i})\sigma_{\alpha_{a,i}}^2$, and $\sigma_{\alpha_{a,i}}^2 = \hat{\sigma}_{h_t}^2 + \sigma_\theta^2$.

17. The method in accordance with claim 16, wherein $$w_{V,i} = \frac{\cos^4\alpha_{a,i}}{\cos^2\alpha_{a,i}\sigma^2_{\hat{r}_{i,cmp}} + \hat{r}^2_{t,i}\sigma^2_{\cos\alpha_{a,i}}}.$$

18. The method in accordance with claim 1, wherein a variance estimation of the estimated velocity magnitude ($\hat{\sigma}_{\hat{V}_t}^2$) is carried out, and a variance of the estimated target velocity magnitude ($\hat{V}_t$) is estimated using weights, wherein the weights satisfy the following condition:

$$\hat{\sigma}_{\hat{V}_t}^2 \propto \frac{n}{\sum_i^n w_{V,i}},$$

wherein $w_{V,i}$ is a weight associated with the target velocity magnitude estimate of an i-th point of reflection of the multiple points of reflection.

19. The method in accordance with claim 18, wherein $$\hat{\sigma}_{\hat{V}_t}^2 = \frac{n}{\sum_i^n w_{V,i}}.$$

20. The method in accordance with claim 1, wherein a plausibility check for the estimated velocity magnitude is carried out, the plausibility check is based on an estimated variance of velocity magnitude ($\hat{\sigma}_{\hat{V}_t}^2$) and the estimated variance satisfies the following condition:

$$\hat{\sigma}_{\hat{V}_t}^2 < k_{max\_magnitude\_var},$$

wherein $k_{max\_magnitude\_var}$ is a threshold value.

21. A radar detection system comprising:
an emitter that is configured to send out a radar signal;
a plurality of detection channels that are respectively configured to detect radar signals reflected in a field of view of the radar detection system in a single measurement instance; and
an evaluation unit implemented, at least in part, with a computing device, the evaluation unit of the radar detection system, the plurality of detection channels, and the emitter configured to work in concert to enable the radar detection system to:
emit, using an emitter of the radar detection system, a radar signal;
receive, using the plurality of detection channels, a reflected version of the radar signal as a plurality of received radar signals based on the radar signal reflecting off the moving target;
detect, with the evaluation unit and in a single measurement instance, multiple points of reflection on the moving target using the plurality of received radar signals;
determine, using the evaluation unit, multiple resolved points of reflection from a moving target in a single measurement instance, each resolved point of reflection of the multiple points of reflection being described by data including: a range, an azimuth angle and a raw range rate in said single radar measurement instance;
responsive to determining a heading angle for each of the resolved points of reflection equates to an orientation angle of said moving target, calculate, using the evaluation unit and in the single measurement instance, the velocity magnitude of said moving target in the horizontal plane as a weighted mean of multiple estimates calculated using the raw range rate and azimuth angle from at least some of the multiple resolved points of reflection and heading angle.

* * * * *